United States Patent
Zipp et al.

(10) Patent No.: US 10,794,787 B2
(45) Date of Patent: Oct. 6, 2020

(54) DIAPHRAGM SEAL ASSEMBLY WITH EVACUATED DOUBLE DIAPHRAGM AND VACUUM MONITORING

(71) Applicant: WIKA Alexander Wiegand SE & Co. KG, Klingenberg (DE)

(72) Inventors: Joachim Zipp, Collenberg (DE); Udo Rosenberger, Woerth (DE); Torsten Pauling, Kleinheubach (DE); Heiko Kern, Klingenberg (DE); Albrecht Kalisch, Grossheubach (DE); Udo Hoerning, Eichenbuehl (DE)

(73) Assignee: WIKA Alexander Wiegand SE & Co. KG, Klingenberg (DE)

( * ) Notice: Subject to any disclaimer, the term of this patent is extended or adjusted under 35 U.S.C. 154(b) by 381 days.

(21) Appl. No.: 15/854,359

(22) Filed: Dec. 26, 2017

(65) Prior Publication Data
US 2018/0180505 A1    Jun. 28, 2018

(30) Foreign Application Priority Data
Dec. 24, 2016  (DE) .................. 10 2016 015 447

(51) Int. Cl.
| | |
|---|---|
| *G01L 19/06* | (2006.01) |
| *G01L 7/08* | (2006.01) |
| *G01L 7/04* | (2006.01) |
| *G01L 13/02* | (2006.01) |
| *G01M 3/02* | (2006.01) |
| *G01M 3/26* | (2006.01) |
| *G01L 19/00* | (2006.01) |
| *G01M 3/28* | (2006.01) |
| *G01L 9/00* | (2006.01) |
| *G01L 21/08* | (2006.01) |

(52) U.S. Cl.
CPC .......... *G01L 19/0672* (2013.01); *G01L 7/041* (2013.01); *G01L 7/043* (2013.01); *G01L 7/048* (2013.01); *G01L 9/0044* (2013.01); *G01L 13/026* (2013.01); *G01L 19/0046* (2013.01); *G01L 19/0645* (2013.01); *G01L 21/08* (2013.01); *G01M 3/26* (2013.01); *G01M 3/283* (2013.01)

(58) Field of Classification Search
CPC ............. G01L 19/0672; G01L 19/0645; G01L 19/0046; G01L 13/026
See application file for complete search history.

(56) References Cited

U.S. PATENT DOCUMENTS

2003/0154794 A1* 8/2003 Textor ................. G01L 19/0645
                                                                    73/706

FOREIGN PATENT DOCUMENTS

| DE | 199 49 831 B4 | 4/2001 | | |
| DE | 19949831 A1 * | 4/2001 | ......... | G01L 19/0672 |
| DE | 10144230 A1 * | 3/2003 | ......... | G01L 19/0672 |

(Continued)

*Primary Examiner* — Herbert K Roberts
(74) *Attorney, Agent, or Firm* — Muncy, Geissler, Olds & Lowe, P.C.

(57) ABSTRACT

A diaphragm seal assembly, which includes a measuring instrument, a pressure being transmitted from a process side to be monitored, via an arrangement of two diaphragms having an evacuated intermediate space disposed therebetween, to the measuring instrument, reliably separated from the process side, the fatigue strength of the diaphragm seal assembly under extreme application conditions being improved.

20 Claims, 9 Drawing Sheets

(56) References Cited

FOREIGN PATENT DOCUMENTS

| EP | 2604989 A1 | * | 6/2013 | ............ | G01L 19/145 |
| EP | 2333508 B1 | * | 7/2016 | ......... | G01L 19/0092 |

* cited by examiner

DIAPHRAGM SEAL ASSEMBLY WITH EVACUATED DOUBLE DIAPHRAGM AND VACUUM MONITORING

This nonprovisional application claims priority under 35 U.S.C. § 119(a) to German Patent Application No. 10 2016 015 447.0, which was filed in Germany on Dec. 24, 2016, and which is herein incorporated by reference.

BACKGROUND OF THE INVENTION

Field of the Invention

The present invention relates to a pressure measuring device or a diaphragm seal assembly for a pressure measuring device, comprising a pressure measuring element which is made, for example, from a tube, for example a Bourdon tube, or a sensor diaphragm. The pressure transmission takes place from one side of a process medium or process fluid to be monitored via a diaphragm seal, which keeps the process medium separate from a pressure measuring element path, whereby a fatigue strength of the pressure measuring instrument may be improved. Accordingly, a diaphragm seal is essentially used to transmit a process pressure, i.e. a pressure to be measured of the process medium, to a pressure measuring device, which includes, for example, a pressure measuring element, as discussed above, in particular when the pressure measuring element is not to come into direct contact with the medium to be monitored for certain reasons. This may be the case, for example, if the medium to be monitored is an aggressive medium, for example a corrosively acting medium, and would attack the pressure measuring element if it came in direct contact therewith, or if the medium to be monitored tends to crystallize or polymerize and would thereby clog connecting lines to the pressure measuring element; however, dead volumes in a measurement line, in which perishable remnants may accumulate and which must also be sealed off with the aid of a diaphragm, are to be avoided, in particular in the food and beverage industry, to name just a few examples. The pressure measuring device is usually a measuring device for measuring and displaying pressure, usually overpressure, of the medium to be monitored, wherein the pressure measuring element may alternatively also be a pressure transmitter, a pressure switch, a pressure transducer or a differential pressure measuring component or the like.

Description of the Background Art

To now provide solutions for improving the continuous use of a pressure measuring device of this type under extreme or rough application conditions, pressure measuring instruments were previously used, in which the process pressure was transmitted via a separating diaphragm to an oil-filled measuring assembly pressure path via sensors and pressure evaluation. However, undesirable damage to the diaphragm may occur, for example cracks in the diaphragm or the like, for example in the case of severe flexing of the diaphragm under potentially occurring extreme conditions. To address this problem, diaphragm seals in the form of multi-part diaphragm arrangements have been proposed in years past, which may include, for example, a so-called interface diaphragm and at least one additional diaphragm, which are provided with, for example, a double-walled or multi-walled design, it being possible to evacuate a intermediate space between the diaphragms of the diaphragm arrangement. The measuring instrument is usually able to respond only when the process medium to be monitored is under a positive pressure, i.e., an overpressure. By monitoring a vacuum present in the intermediate space, it is possible to ascertain whether the diaphragms of the multi-part diaphragm arrangement are still intact or whether a leak in the diaphragm arrangement is present, due to the overpressure, as a result of damage to one or multiple of the multi-part diaphragms.

As an example of a diaphragm seal of a pressure measuring device having a multi-part diaphragm arrangement according to the prior art, the patent specification DE 199 49 831 B4, which is incorporated herein by reference, discloses a diaphragm seal which includes a flat diaphragm arrangement or diaphragm unit made from a first corrugated diaphragm and a second corrugated diaphragm, a intermediate space being formed between the two diaphragms. The diaphragm unit represents a separation between a process medium to be monitored and a transmitting fluid, which transmits a process pressure to the pressure measuring sensor of the pressure measuring device in a preferably unfalsified manner. In this known pressure measuring device, the intermediate space between the two corrugated diaphragms is evacuated, and the evacuation state of the intermediate space is monitored to be able to detect a crack or a breach of the diaphragm and thus a damage to the diaphragm seal, making it possible to prevent the medium to be monitored from passing through to the pressure measuring element (leakage). In this diaphragm seal, it is essential that the width of the intermediate space, i.e., the distance between the two diaphragms, approaches zero before the intermediate space is evacuated. This arrangement serves as a preparatory measure prior to evacuation in order to achieve a preferably adjoining arrangement in advance of the evacuation, and it is ultimately aimed at placing the two diaphragms into an arrangement, preferably in complete, planar contact, in the evacuated state.

In diaphragm seals according to the prior art, however, it has proven to be problematic that the inner sides of the two diaphragms which are already in contact with each other prior to the evacuation form a suction with each other or come into further contact with each other as desired during the evacuation. However, due to the preparatory close arrangement of the diaphragms, air bubbles, for example, may become enclosed in the furrows of the corrugated diaphragms, which may thus not be completely evacuated. In particular, manufacturing errors may occur during the further manufacturing process, i.e., during welding, embossing, filling, evacuation and intermediate steps. These errors are embossing and joining errors as well as air pockets during evacuation. These air pockets (bubbles) may negatively impact the evacuation state of the diaphragm seal and may lead to, for example, incorrect monitoring results or poor transmission in the pressure path and thus lead to poor measurement results. This may occur, for example, in the case of a detached, migrating air bubble, due to a movement of the diaphragm, which may result in an incorrect reading of a leak in the double-diaphragm arrangement or, in particular, corrupt a pressure measurement.

SUMMARY OF THE INVENTION

It is therefore an object of the present invention generally to provide a diaphragm seal assembly, which includes at least one measuring instrument, a pressure being reliably transmitted from a process side to be monitored, via an arrangement of two diaphragms having an evacuated intermediate space disposed therebetween, to a pressure measuring instrument, reliably separated from the process side, the fatigue strength of the diaphragm seal assembly under extreme application conditions being improved. This is to be achieved with the aid of a double interface diaphragm, so that damage to one diaphragm does not directly result in damage to the measuring instrument and thereby in a failure of the measuring device, and so that the process medium does not mix with the transmitting fluid. For this purpose, a vacuum is applied and monitored between the diaphragms, so that in the case of damage to the diaphragm arrangement, the diaphragm seal or the entire measuring device may be replaced or repaired at the earliest opportunity without further impairments occurring. Up to now, however, a reliable monitoring of the evacuation state in the intermediate space between the diaphragms may not always be reliably guaranteed, as is already described above with reference to the known prior art.

To address problems of this type, an object of the present invention is also to provide a cost-efficient and effective approach to improving the continuous use of diaphragm seals under extreme or rough application conditions. An improved diaphragm seal assembly is therefore to be provided, which includes a diaphragm seal path which is filled with a pressure transmitting medium, the diaphragm seal assembly including a double diaphragm having a intermediate space for extreme application conditions, which is under vacuum and which is to be reliably monitored for tightness. Both the diaphragm seal of the present invention and the integrated vacuum monitoring and the corresponding signal routing are to be optimized with respect to fatigue strength and safety as well as with respect to a simplified manufacture.

In an embodiment, the present invention is based on the approach that a structural and more reliable diaphragm seal assembly having an interface diaphragm structure is to be provided, in which a maximum robustness may be cost-efficiently achieved even under extreme conditions, and which may be further used for a short period of time in the case of a diaphragm breach and signals the diaphragm breach. This applies, in particular, to vibrations, pressure fluctuations, pulsation, fluid hammers and penetration of the interface diaphragm structure by foreign bodies potentially present in the process medium. In pharmaceutical applications, in particular, and in the food and beverage industry, it is harmful if a batch is contaminated by diaphragm seal fluid, for example transmitting oil on the secondary side of a diaphragm seal. An early detection of a crack may prevent the contamination of a batch, for example by displaying the crack in good time based on a vacuum loss, so that, for example the diaphragm seal or the entire pressure measuring device may be immediately replaced. The design of the diaphragm unit as a double diaphragm furthermore has the effect that the fill fluid and the process medium to be monitored do not come into contact with each other even if one of the two diaphragms should break, since the other of the two diaphragms still keeps the process medium and the fill fluid separate from each other.

According to an embodiment of the invention, a diaphragm seal assembly is thus proposed, which includes a base body having at least one first diaphragm and a second diaphragm, a first measuring instrument for monitoring a pressure of a process medium and a second measuring instrument, the first diaphragm facing the process medium to be monitored, the second diaphragm facing a fluid-filled pressure path; and a intermediate space is formed between the first diaphragm and the second diaphragm. In the assembly according to the invention, the intermediate space between the first diaphragm and the second diaphragm is furthermore evacuated; the latter is therefore not vented, but instead the absolute pressure of zero prevails in the intermediate space and in each cavity in flow connection therewith, the term "absolute pressure of zero" being understood to be a vacuum which may be technically implemented with a justifiable complexity and which has a pressure of less than 100 mbar and preferably less than 10 mbar. The fact that, in the diaphragm seal assembly according to the invention, the intermediate space and each cavity connected thereto are evacuated also has the advantage that the process medium may not be contaminated if only one diaphragm breaks, since no medium from the evacuated intermediate space is able to reach the process medium.

The vacuum present in the intermediate space is monitored, according to the invention, by the second measuring instrument, an outer edge of the first diaphragm being situated from the outer edge of the second diaphragm by a predetermined minimum distance. This has the advantage that the two diaphragms are spaced apart by a predetermined minimum distance in a non-evacuated state of the intermediate space, i.e. in an assembly state of the diaphragm seal assembly, preferably at each point where the diaphragms thus run in parallel to each other with the predetermined distance therebetween. When the intermediate space is evacuated, the diaphragms are thereby sucked in toward each other, first in the center thereof. During the further course of evacuation, the diaphragms are sucked into toward each other from the inside to the outside, in the case of round diaphragms, therefore, from their center to their outer edge, so that any air bubbles are sucked or pressed from the inside to the outside. A preferably perfect evacuation of the intermediate space between the two diaphragms may be achieved thereby; and an incorrect reading of a leak in the double diaphragm arrangement, for example due to detached, migrating air bubbles (air remnants), may be prevented. The diaphragms preferably have a thickness of 0.01 mm to 0.5 mm, for example 0.03 mm to 0.2 mm. The diaphragms may furthermore have a corrugated design, i.e. a wavy shape, which in round diaphragms runs in a wavy manner from the middle thereof to the edge thereof, the wave shape having a "wave length" of 0.5 mm to 20 mm, preferably 0.7 mm to 12 mm, and a double amplitude of 0.1 mm to 2.0 mm, preferably 0.15 mm to 1.5 mm. The double amplitude is also referred to as radial runout. Alternatively, each diaphragm may have a stepped shape, with a step spacing of 0.5 mm to 20 mm, preferably 0.7 mm to 12 mm.

In other words, the diaphragm seal assembly can include a measuring instrument, comprising for example a measuring element in the form of a Bourdon tube or a diaphragm or a sensor, as well as an evaluating device connected thereto, which displays pressure values on a gauge, the measuring instrument having a pressure connecting channel, which is filled with a pressure transmitting medium on the secondary side, and which is separated from the process from the primary side by a double interface, for example in the form of a wavy double diaphragm, the interface being characterized by a double, congruent section having a certain minimum distance therebetween, and the diaphragm on the primary side preferably being able to be larger than the diaphragm on the secondary side. The two diaphragms together thus form a reinforced "sandwich diaphragm," via which the process pressure is able to act upon the pressure transmitting medium and the measuring element. By welding the diaphragms on different levels, the evacuated double diaphragm assembly would, calculated together, have a more rigid and more robust action than the two diaphragms individually, in particular in their overall behavior. The double diaphragm may furthermore be optimized with respect to its behavior under vacuum by an intermediate layer. Since, in the diaphragm seal assembly according to the invention, the intermediate space between the two diaphragms is thus evacuated, at a measuring pressure that is greater than the absolute pressure zero, a pressure increase inevitably occurs at the second measuring instrument when one of the two diaphragms is breached and therefore leaks. This pressure increase is then detected by the second measuring instrument and may be converted into a corresponding reading or a corresponding warning signal.

According to an refinement of the diaphragm seal assembly according to the invention, a recess is provided in the base body, so that at least two recess steps are provided in the base body, which form the two different levels and which are spaced apart by the predetermined minimum distance and are used to arrange the first diaphragm and the second diaphragm. The outer edge of the first diaphragm is disposed on one recess step, i.e., on one level, and the outer edge of the second diaphragm is disposed on another recess step, i.e., on another level. As a result, the two levels are spaced apart by the predetermined minimum distance. This has the advantage that the minimum distance from the edge of the diaphragms may be clearly defined from a manufacturing perspective, without compromising the intermediate space between the diaphragms. The predetermined minimum distance is preferably in a range from 0.01 mm to 1.2 mm, for example in a range from 0.05 mm to 0.5 mm. As a result, the aforementioned technical effect of the two diaphragms approaching each other by being sucked in toward each other from the inside to the outside may be ensured during evacuation.

In an embodiment, the diaphragm seal can be characterized by a circumferential ring channel (groove), or a circular gap, which is situated between the two diaphragms and enables the atmospheric air between the two diaphragms to be completely extracted during the evacuation. Due to the gap or groove, the vacuum may first form all the way around and then slowly bring the diaphragms evenly into contact until they form a complete double diaphragm. For this purpose, the circular groove or the gap is circumferential and connected to the vacuum channel at one point. In connection with the step described above, the fact that the two diaphragms first bend in the middle and then come into contact at this point is, in particular, predefined.

In an embodiment of the diaphragm seal assembly, the base body can be a tubular base body, and the recess can be provided within a pipe interior, i.e., in a continuous clearance in the form of a through-bore in the tubular base body, the first diaphragm and the second diaphragm being disposed in the through-bore of the tube in the form of pipe diaphragms. The recess is again provided in the base body in such a way that at least two steps are provided in the base body, which form the two different levels, one level being the inner circumference of the pipe interior and the other level being in the inner circumference of the recess. As a result, the two levels are spaced apart by the predetermined minimum distance and are used to arrange the first diaphragm and the second diaphragm so that the first diaphragm is disposed within the second diaphragm, the outer edge of the first diaphragm, representing the outer circumference thereof, and the outer edge of the second diaphragm representing the outer circumference thereof, and the outer circumference of the first diaphragm and the outer circumference of the second diaphragm being spaced apart by the predetermined minimum distance. The inner diaphragm, i.e. the first diaphragm ends at its longitudinal ends with the particular longitudinal ends of the through-bore, so that a uniform inner surface of the diaphragm seal assembly results according to the present embodiment. This has the advantage that processes may also be detected by the diaphragm seal assembly according to the invention which require an optimum cleaning and emptying capability in all installation positions of the diaphragm seal assembly.

According to an embodiment of the diaphragm seal assembly according to the invention, the base body furthermore has a groove which is fluid-connected to the second measuring instrument and which is provided in the recess step of the second diaphragm, i.e. which is located on a level of the attachment of the second diaphragm. and which is provided laterally outside the outer edge of the second diaphragm, i.e. introduced into the base body outside the second diaphragm, the groove being circumferentially provided in the second diaphragm. "Circumferentially" can be understood to be at least one semicircular path around the second diaphragm at this point. The groove has, for example, a width of 0.3 mm to 3 mm and a depth of 0.2 mm to 1.5 mm. In cross section, the groove can have a semicircular shape, which may have a radius of 0.1 mm to 1.5 mm, the edges of the groove preferably being able to have a deburred or rounded design. The groove in the base body has the advantage that the vacuum is able to completely reach the intermediate space between the two diaphragms when the intermediate space is evacuated.

The second measuring instrument and the intermediate space between the first diaphragm and the second diaphragm may furthermore be advantageously fluid-connected gas-tight, an evacuation connection being connected gas-tight to the channel, this evacuation channel being sealed doubly gas-tight. In other words, the connecting piece for applying the vacuum is itself sealed, for example welded, and the connecting piece additionally includes a cover, for example in the form of a covering cap, which is also welded gas-tight, whereby the connection for applying the vacuum has a double gas-tight design. The vacuum path is furthermore optimized for a durability of the vacuum with regard to its volume and is preferably fitted with a material, for example a getter material, which improves the vacuum quality over time, i.e. over the lifetime of the diaphragm seal assembly, in that free substances are absorbed and stored. Platinum or titanium can be used as getter material, as well as barium, aluminum, zirconium iron or pure or alloyed magnesium, preferably having an open, enlarged surface. Valve and/or diaphragm arrangements may furthermore be integrated into the channel, which protect the second measuring instrument against overpressure in the case of a leak. In the case of a vacuum loss, for example a diaphragm breach, a valve device or another diaphragm, thus furthermore protects the second measuring instrument, i.e., the monitoring device for the vacuum, for example against a pressure wave from the process.

According to embodiment of the diaphragm seal assembly according to the invention, a measuring signal of the first measuring instrument can be looped through the second measuring instrument, the second measuring instrument applying an error signal to the looped-through measuring signal in the case of a leak. In other words, if the evaluation for the first measuring instrument of the diaphragm seal assembly and the evaluation of the second measuring instrument designed as the leak detecting unit are provided with an electronic design, a measuring signal may be forwarded as a loop to a higher-level process environment, an alarm value being transmitted together with the signal value to a shared line in the case of a diaphragm breach. This has the advantage that commercial measuring instruments may be used, which provides, for example a 4 mA to 20 mA output for a pressure value, the second measuring instrument allowing this signal to pass as long as the vacuum is within the setpoint range in the intermediate space between the diaphragms as well as in the channel in the diaphragm seal assembly.

To now further ensure a better ability to monitor the vacuum in the intermediate space of the diaphragms, according to another preferred refinement of the diaphragm seal assembly according to the invention, preference is to be given to orienting a gauge of the first measuring instrument in the same visual axis as a gauge of the second measuring instrument, so that a viewer or process viewer has both gauges in his field of vision while viewing the diaphragm seal assembly. Both gauges may be mounted on the base body eccentrically or decentrally, i.e. so that neither of the two gauges is disposed in the middle of the base body, the second measuring instrument, i.e. the leak detection unit, being able to be situated upstream from the first measuring instrument, i.e. the pressure measuring instrument, and the process viewer is able to view the two gauges from one viewing direction, so that they are disposed in parallel to each other in his viewing direction, i.e. are oriented in the same direction. Alternatively a gauge of the first measuring instrument and a gauge of the second measuring instrument may be integrated into a common gauge, so that the viewer also has both gauges in his field of vision when viewing the diaphragm seal assembly. The first measuring instrument may be disposed centrally on the base body, and the second measuring instrument may be situated, for example, radially upstream from the first measuring instrument, so that the process viewer is again able to view both gauges in parallel to each other from one viewing direction, so that they are again oriented in one direction.

This has the advantage that the process viewer always has the pressure to be measured as well as the vacuum state of the two diaphragms, i.e. the state of the diaphragm seal in the sense of, for example, "okay" or "damaged," in one and the same field of vision, whereby an ability to monitor of the functionality of the diaphragm seal is significantly improved.

According to an embodiment of the diaphragm seal assembly according to the invention, the total inner volume within all vacuum-carrying components of the diaphragm seal assembly is in a range from 3 ml to 100 ml, for example 5 ml to 50 ml. The diameter of the first diaphragm may furthermore be 8 mm to 200 mm, for example 12 mm to 120 mm. Moreover, the diameter of the first diaphragm may be 5 mm to 80 mm, for example 8 mm to 50 mm, bigger than the diameter of the second diaphragm.

Accordingly, the geometries of the vacuum path and the diaphragms may be optimized with the aid of the diaphragm seal assembly according to the invention. If an electronic gauge unit for monitoring the vacuum is used, which is implemented in the signal loop of the pressure measuring instrument, different additional signal options may be provided. Alternatively, in an optionally installed mechanical gauge unit, an optimization of the diaphragm seal assembly may be achieved by means of orientation or implementation. On the whole, a function of the diaphragm seal assembly may be achieved by means of the present invention by an optimized geometry of the vacuum-containing space as well as an improvement of the detection of a failure of one diaphragm by an electronic gauge unit or alternatively an improvement in the detection of an error situation by an oriented arrangement of a mechanical gauge.

In an embodiment, this assembly can be presented, in particular, in the form of a pipe diaphragm seal. The latter is also used, for example, in market segments of the food and beverage industry. In this industry as well as in dairies, pipeline systems are cleaned, in particular, using pigs. A crack in a pipe diaphragm seal usually immediately results in a contamination of the batch without it being noticed right away. A pipe diaphragm seal, including a monitored double diaphragm, provides the advantage of double safety due to the double diaphragm assembly, with simultaneous monitoring of the diaphragms by monitoring the vacuum between the diaphragms.

A further improvement of the vacuum life may be achieved in that enlarged vacuum repository chambers are provided in the assembly.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
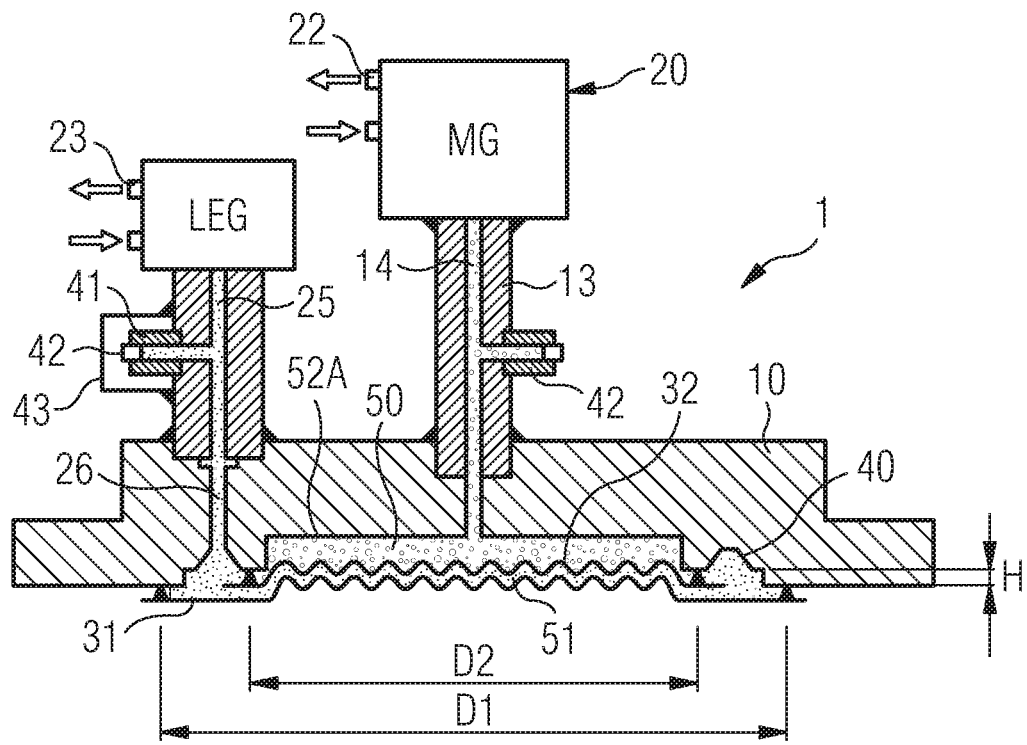
FIG. 1 shows a diaphragm seal assembly according to the invention according to a first preferred embodiment, before a connection to a process chamber to be monitored.
Figure 1:
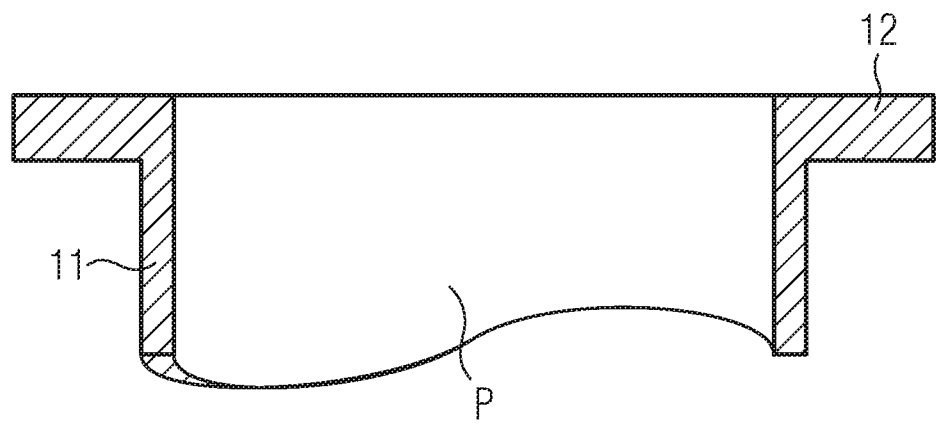

FIG. 1 shows a diaphragm seal assembly 1 according to the invention according to a first preferred embodiment, before a base body 10 of diaphragm seal assembly 1 is connected to a process chamber P to be monitored. Diaphragm seal assembly 1 illustrated in FIG. 1 mainly comprises base body 10, which is essentially disk-shaped, preferably in the form of a flange, which is connectable by a thread or via a clamp connection, a screw connection or the like to a sealing flange 11 of a connecting piece 12 of process chamber P, in which a process medium (not illustrated) to be monitored is present. Base body 10 may be made from a metallic material, for example from an austenitic steel. Alternatively, however, a design made from a plastic material, for example a fluoropolymer, may also be considered. In the assembled or mounted state, base body 10 terminates tightly with sealing flange 12 for the purpose of being able to receive a pressure of the process medium without falsification. On its other side, base body 10 includes a first measuring instrument MG for measuring pressure and a second measuring instrument LEG as a leak detecting unit. For the purpose of transmitting the pressure to be measured to first measuring instrument MG, diaphragm seal assembly 1 has a pressure connecting channel 13 which acts as a pressure path and which is filled with a fluid pressure transmitting medium 14, also referred to as diaphragm seal fluid 14, for example a pressure transmitting oil, via which first measuring instrument MG is fluid-connected to base body 10. Pressure connecting channel 13 may be filled with pressure transmitting medium 14 via a filling connection 42, which is closed following filling and is welded gas-tight. Measuring instrument MG is designed, for example, in the form of a manometer or pressure sensor, which is preferably provided with expansion measuring elements and to which an evaluation device is connected in the form of an electronic circuit board. However, the measuring element of measuring instrument MG may also be designed in the form of a Bourdon tube, which is not illustrated here, to which a motion work is coupled as the evaluation device.

In the case of an electronic evaluation device instead of a motion work evaluation device, a corresponding circuit board is preferably disposed in a housing 20 of first measuring instrument MG, which is connected directly or indirectly to a process environment via a connection 22, where it is able to transmit its measured values directly. The measured values may represent pressure values in the form of logs, for example including 4 mA to 20 mA unit signals, HART or telegrams, which are transmitted to a control room of the process environment via connection 22. The measured pressure values are then displayed on a gauge here, or they control additional processes directly.

Base body 10 of diaphragm seal assembly 1 has at least one recess on the process side, so that two recess steps are provided in the underside of base body 10, one recess step being able to be formed by the underside of base body 10 and the other recess step being able to be formed by the base of the recess. The two recess steps form different levels, which are spaced apart by a predetermined minimum distance H and are used to arrange a first, process-side diaphragm 31 and a second pressure path-side diaphragm 32. Accordingly, the recess on the underside of base body flange 10 illustrated in FIG. 1 is closed by first diaphragm 31, which is referred to as primary interface diaphragm 31, and the recess is covered by a first diameter D1, second interface diaphragm 32, which has diameter D2, being disposed congruently thereunder. Both diaphragms 31, 32 have a corrugated surface, the particular corrugation being formed by annular wave crests and annular wave troughs, which are all disposed and formed concentrically to each other. Diaphragm 31 has a corrugation which is complementary to the corrugation of diaphragm 32 and vice versa. A precise design of the wave shape of the two diaphragms 31, 32 will be described in greater detail later on with reference to FIG. 6. As in usual diaphragm seals, second diaphragm 32 covers pressure connecting channel 13, via which the process pressure in process chamber P is transmitted in the direction of first measuring instrument MG with the aid of pressure transmitting medium 14. Due to the sealed measuring system filled with pressure transmitting medium 14, foreign substances are prevented from reaching the measuring instrument (not illustrated) and clogging pressure measuring channel 13 or the measuring instrument itself and being able to impair the function thereof. Diaphragms 31, 32 used are very thin to ensure an optimum pressure transmission behavior, whereby they may be susceptible to cracks. In this case, upstream diaphragm 31, together with other diaphragm 32, thus forms a double barrier which may effectively protect a process to be monitored against contamination by pressure transmitting medium 14.

The predetermined minimum distance between the diaphragms results from dimension H, which defines the distance of the two diaphragm levels, i.e. the step height, and which is always greater than the diaphragm thickness of downstream diaphragm 32. The augmentation is in a range of, for example, 0.05 mm to 0.5 mm with respect to the thickness of diaphragm 32. The outer edge of first diaphragm 31 is fastened gas-tight on the first recess level, preferably welded thereto, and the outer edge of second diaphragm 32 is fastened, preferably welded, on another, lower recess step, so that the two diaphragms 31, 32 are spaced apart from each other by the step height (recess step dimension H). Accordingly, the two diaphragms 31, 32 are preferably welded to base body 10, on both sides of a groove 40 on two different levels in each case. Alternatively, diaphragms 31, 32 may also be connected fluid-tight to base body 10 along the entire circumference of particular diaphragm 31, 32 by means of soldering or gluing. As illustrated in FIG. 1, second diaphragm 32, together with base body 10, thereby forms a diaphragm seal working chamber 50 in the recess, which forms the diaphragm seal path to first measuring instrument MG together with pressure connecting channel 13, the diaphragm seal path being filled with pressure transmitting medium 14 via fill connection 42. This provides the double diaphragm assembly of diaphragm seal assembly 1 according to the invention an increased stability and an improved response behavior as well as an improved transmission behavior of the process pressure to first measuring instrument MG.

First diaphragm 31 has a weld pad diameter D1, and second diaphragm 32 has a weld pad diameter D2. Due to the spaced structure of the two diaphragms 31, 32, an intermediate space 51 is formed between diaphragms 31, 32, which is connected to second measuring instrument LEG via a vacuum channel 26 in base body 10 and a continuing vacuum channel 25 in the connecting piece of second measuring instrument LEG. Diaphragm intermediate space 51 and vacuum channel 25, 26 connected thereto may be evacuated via an evacuation connection 41, evacuation connection 41 being closed after the evacuation, preferably by welding to a plug 42, or by sealing, soldering a capillary line connecting piece, and a sealing cap 43 furthermore being placed over evacuation connection 41 and also being welded, so a double gas-tight closure of evacuation connection 41 is achieved. Even if the inner space beneath the cap is only optionally evacuated, this second volume is another essential barrier for protecting the vacuum, occasionally also because the space beneath the cap is greatly minimized. It is also optionally possible to seal the vacuum path by welding. At the same time, intermediate space 51 between diaphragms 31, 32 is evacuated, and the vacuum is guided to second measuring device LEG in its function as a leak detecting unit via vacuum channel 25, 26. In the case of a diaphragm crack, a decrease in the vacuum is thereby detected by leak detecting unit LEG and output at output 23 as a signal and/or alarm message.

In particular, processes in the area of pharmaceuticals involve highly cost-intensive agents, and the requirements of such processes are also associated with the final inspection of all measuring instruments to ensure that, for example, no contamination by diaphragm seal fluids has taken place. An inspection and disassembly may, however, be eliminated by diaphragm seal assembly 1 according to the invention, in that additional instruments, such as leak detecting unit LED, indicate that diaphragms 31, 32 are undamaged. To increase the functional reliability and the precise transmission behavior of the process pressure in process chamber P to first measuring instrument MG, front primary diaphragm 31 has a diameter of, for example, 12 mm to 120 mm and may be manufactured from high grade steel. In particular, first diaphragm 31 is larger in relation to the second diaphragm with respect to its diameter, for example 8 mm to 50 mm larger than the diameter of secondary diaphragm 32.

According to the invention, base body 10 furthermore has groove 40 in the recess laterally next to second diaphragm 32 and below first diaphragm 31 in fluid connection to vacuum channel 25, 26, whereby groove 40 has a diameter which is smaller than outer diameter D1 of first diaphragm 31 but larger than the outer diameter of second diaphragm 32. Groove 40 may be introduced into the recess in base body 10 by turning, for example as a recess, which is preferably present in the shape of a U, the shape of a V or in the shape of a trapezoid and is connected to second measuring instrument LEG via vacuum channel 25, 26. The groove supports the reliable evacuation of intermediate space 50 between the two diaphragms 31, 32 and ensures that, in the case of a leak, i.e. in the case of a diaphragm crack, a vacuum decrease induced thereby may be quickly detected.

In manufacturing a diaphragm seal assembly 1 according to the invention, further improvements may be achieved with respect to the transmission behavior of the pressure to first measuring instrument MG by take the following assembly steps, for example, in this order:

Mount and weld second diaphragm 32 to base body 10;
Mount and weld first diaphragm 31 to base body 10;
Connect base body 10, including pressure connecting channel 13, to first measuring instrument MG and weld gas-tight;
Connect second measuring instrument LEG, i.e. leak detecting unit LEG, to base body 10 via channel piece 25 and weld gas-tight;
Evacuate diaphragm intermediate space 51 via evacuation connection 41 and weld evacuation connection 41 by gas-tight welding;
Evacuate diaphragm seal working chamber 50 and the diaphragm seal path in pressure connecting channel 13 to first measuring instruments MG via fill connection 42;
Fill diaphragm seal working chamber 50 and the diaphragm seal path in pressure connecting channel 13 to first measuring instrument MG with diaphragm seal fluid 14 via fill connection 42; and
Close and weld fill connection 42 gas-tight.

In the assembly method described above, helium may optionally be applied to diaphragm intermediate space 51 between diaphragms 31, 32 as an intermediate step, this helium being filled at a certain pressure to be able to check the tightness of the weld seams from the outside using helium detectors. Alternatively or additionally, the diaphragm seal assembly and, in particular, diaphragm intermediate space 51 between diaphragms 31, 32 may be sterilized to make it uncritical for continuous production in the food and beverage industry even in the case of a diaphragm breach of primary diaphragm 31. In particular, evacuation connection 41 is welded gas-tight for diaphragm seal assembly 1 described here and therefore has a leakage rate of less than $1*10^{-3}$ $mbar*l/s$, which may be ascertained or checked with the aid of a helium leak test. To further improve the vacuum for the purpose of achieving a preferably continuous monitoring, it is sensible to structurally set a total volume for monitoring leaks, which includes groove 40, diaphragm intermediate space 51 between diaphragms 31, 32, vacuum channel 25, 26, evacuation connection 41 and the measuring volume of second measuring instrument LEG, to 3 ml to 100 ml, preferably 5 ml to 50 ml.

Figure 2:
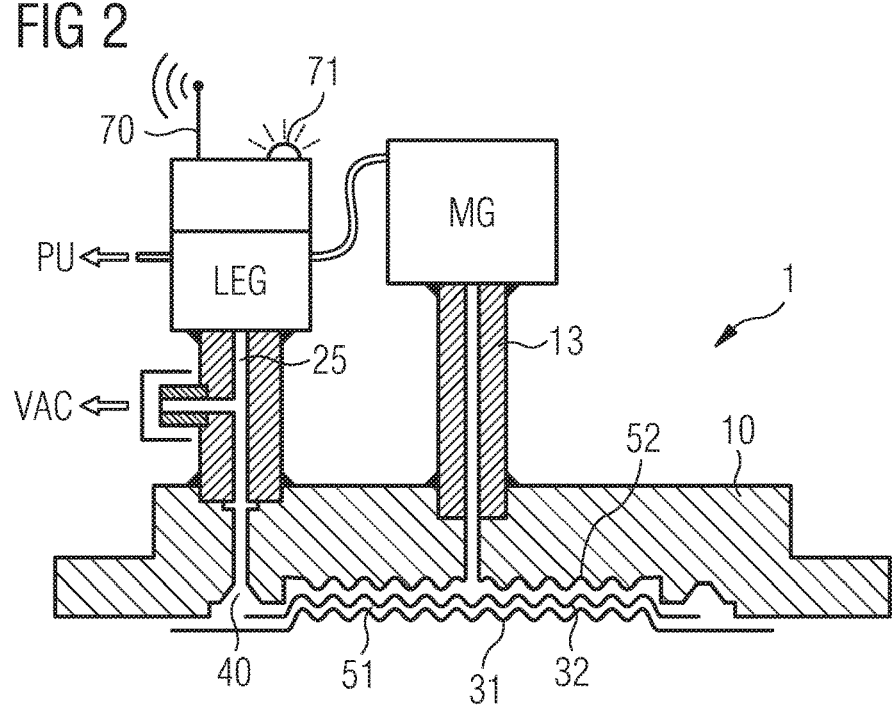
FIG. 2 shows a diaphragm seal assembly according to the invention according to another preferred embodiment.

FIG. 2 shows a diaphragm seal assembly 1 according to the invention according to another preferred embodiment of the present invention, in which second measuring instrument LEG, i.e. the leak detecting device or the vacuum monitoring device, is designed in such a way that the measuring signal from first measuring instrument MG is looped through second measuring instrument LEG, as illustrated on the basis of an indicated line between first measuring instrument MG and second measuring instrument LEG. In this manner, a commercial measuring instrument which provides, for example a 4 mA to 20 mA output for a pressure value, may be used for first measuring instrument MG, second measuring instrument LEG allowing this signal to pass as long as the vacuum in diaphragm seal assembly 1 is within the setpoint range in intermediate space 51 of diaphragms 31, 32 as well as in groove 40 and in channel 25. In the case of a vacuum loss, as is usually the case when a diaphragm is breached, second measuring instrument LEG raises the signal to less than 4 mA or greater than 20 mA and thus signals an alarm or a failure of the diaphragm seal assembly to a process environment PU or a control room.

Alternatively, the looped-through signal may be modulated, for example when using another protocol, for the purpose of indicating a failure of diaphragm seal assembly 1; this is possible, for example, in connection with the HART protocol. A corresponding alarm may be output, for example by radio via an antenna 70, as a data message to a remote device, for example via SMS or email or the like, and/or optically directly via a warning lamp such as a flashing lamp 71, and/or via an acoustic signal using a horn or a siren.

In diaphragm seal assembly 1 illustrated in FIG. 2, another difference from the assembly illustrated in FIG. 1 is to be found in that base 52B of the preferably flat recess in base body 10, as shown in FIG. 1, which forms a so-called diaphragm bed, in particular for second diaphragm 32, has a corrugated surface. The corrugation is formed from annular wave crests and annular wave troughs, which are all disposed and formed concentrically to each other. The diaphragm unit of diaphragms 31, 32 has a corrugation which is complementary to the corrugation of the diaphragm bed, unlike in the smooth design of diaphragm bed 52A of diaphragm seal assembly 1 in FIG. 1.

Figure 3A:
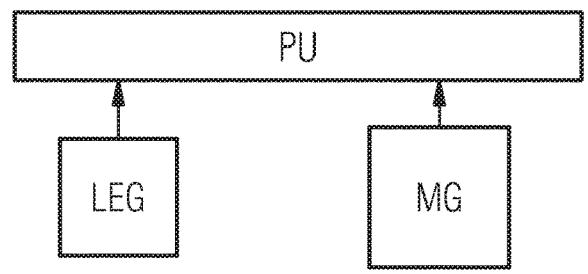
FIGS. 3A-3C show examples of a connection of measuring instrument of the diaphragm seal according to the invention to a process environment.
Figure 3B:
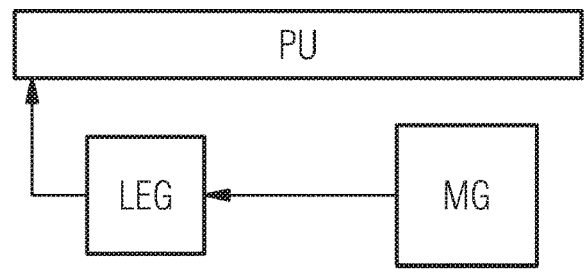
Figure 3C:
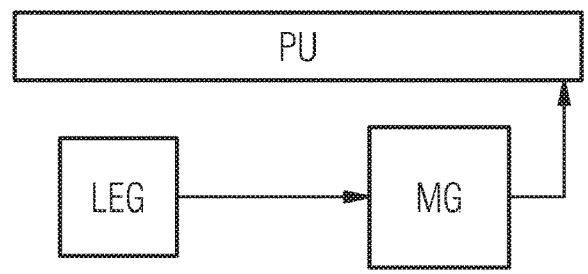

FIGS. 3A through 3C show examples of the connection of first measuring instrument MG and second measuring instrument LEG of a diaphragm seal assembly 1 according to the invention to a process environment PU, second measuring instrument LEG, in its function as a leak detecting device or vacuum monitoring device, being connected in parallel to a process environment PU, with respect to first measuring instrument MG, in its function as a pressure measuring device, particularly in FIG. 3A. In the embodiment according to FIG. 3B, second measuring instrument LEG is connected as a so-called through-master to first measuring instrument MG to a process environment PU; accordingly, first measuring instrument MG is connected in series only to second measuring instrument LEG, which is also connected to process environment PU, and the signal of first measuring instrument MG is looped through the second measuring instrument and only then output to process environment PU. FIG. 3C furthermore shows an arrangement which is reversed with respect to FIG. 3B, in which second measuring instrument LEG is connected in series only to first measuring instrument MG, and this time first measuring instrument MG is also connected to the process environment. This is advantageous if first measuring instrument MG has an additional input of this type for connecting second measuring instrument LEG, and the latter is already connected to a process environment PU, for example via wirelessHART or other protocols.

Figure 4A:
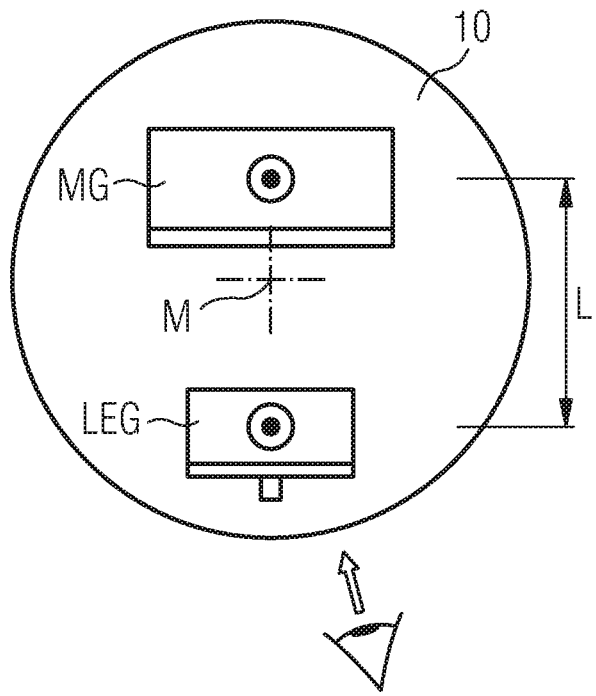
FIGS. 4A and 4B show examples of the view of gauges of the diaphragm seal assembly according to the invention according to different preferred embodiments viewed from above.
Figure 4B:
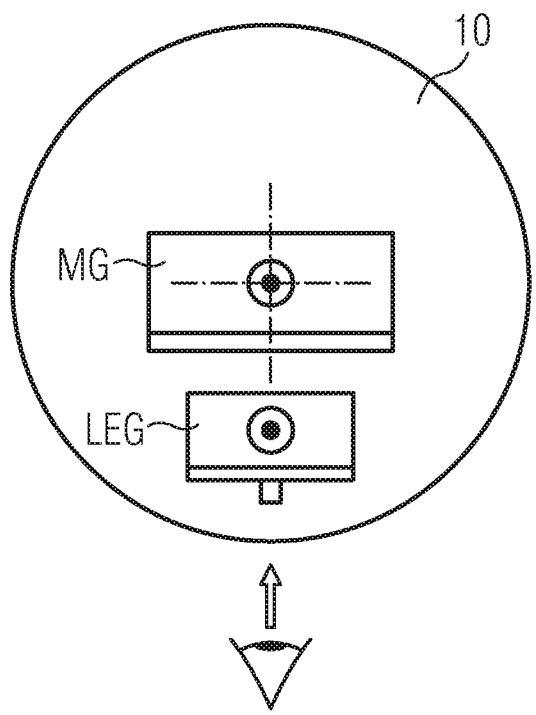

FIGS. 4A and 4B show examples of the view of gauges or gauge devices, for example analog dial gauges or the like, of diaphragm seal assembly 1 according to the invention according to different preferred embodiments, in a top view of base body 10. In FIG. 4A, a middle of base body 10 is designated by the letter M, and a distance between the two gauges is represented by the letter L. A viewer of the two gauges is represented in both FIGS. 4A and 4B by a schematic eye, whose viewing direction is indicated by an arrow. In FIG. 4A, the gauge of second measuring instrument LEG and the gauge of first measuring instrument MG are mounted eccentrically or decentrally on base body 10, so that neither of the two gauges is disposed in middle M, second measuring instrument LEG being able to be situated upstream from first measuring instrument MG, both gauges, however, being oriented in parallel to each other for a process viewer from his viewing direction, i.e. oriented in the same direction. As a result, the viewer may view both gauges simultaneously when viewing them obliquely. Alternatively, an arrangement is illustrated in FIG. 4B, in which first measuring instrument MG is mounted centrally on base body 10, second measuring instrument LEG being situated radially upstream from first measuring instrument MG, and both gauges being again oriented in parallel to each other for a viewer in one viewing direction. The measuring instrument LEG is situated, in particular, at another, lower height than measuring instrument MG and is therefore easy to see.

Figure 4C:
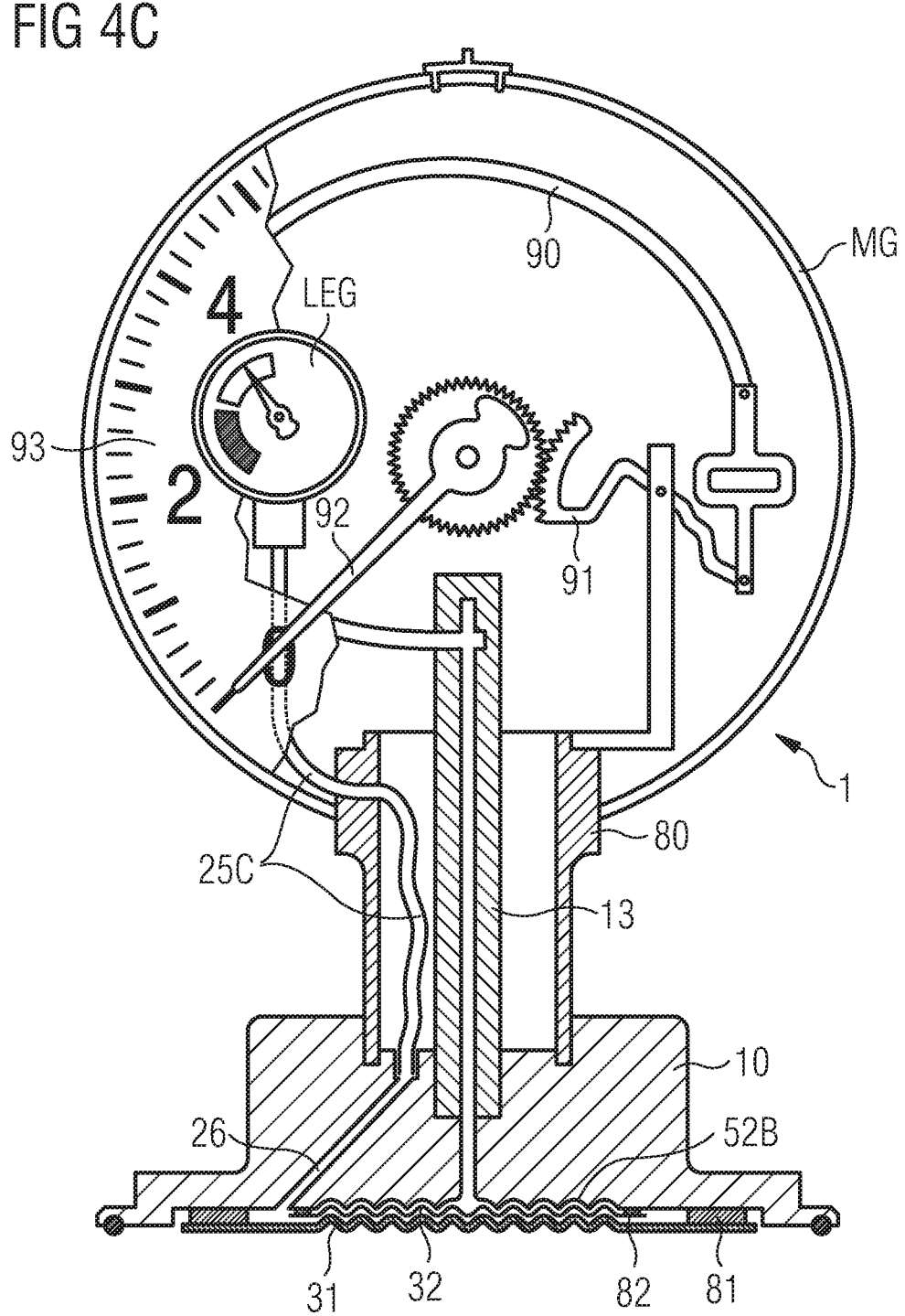
FIGS. 4C to 4E show additional preferred embodiments of the diaphragm seal assembly according to the invention.
Figure 4D:
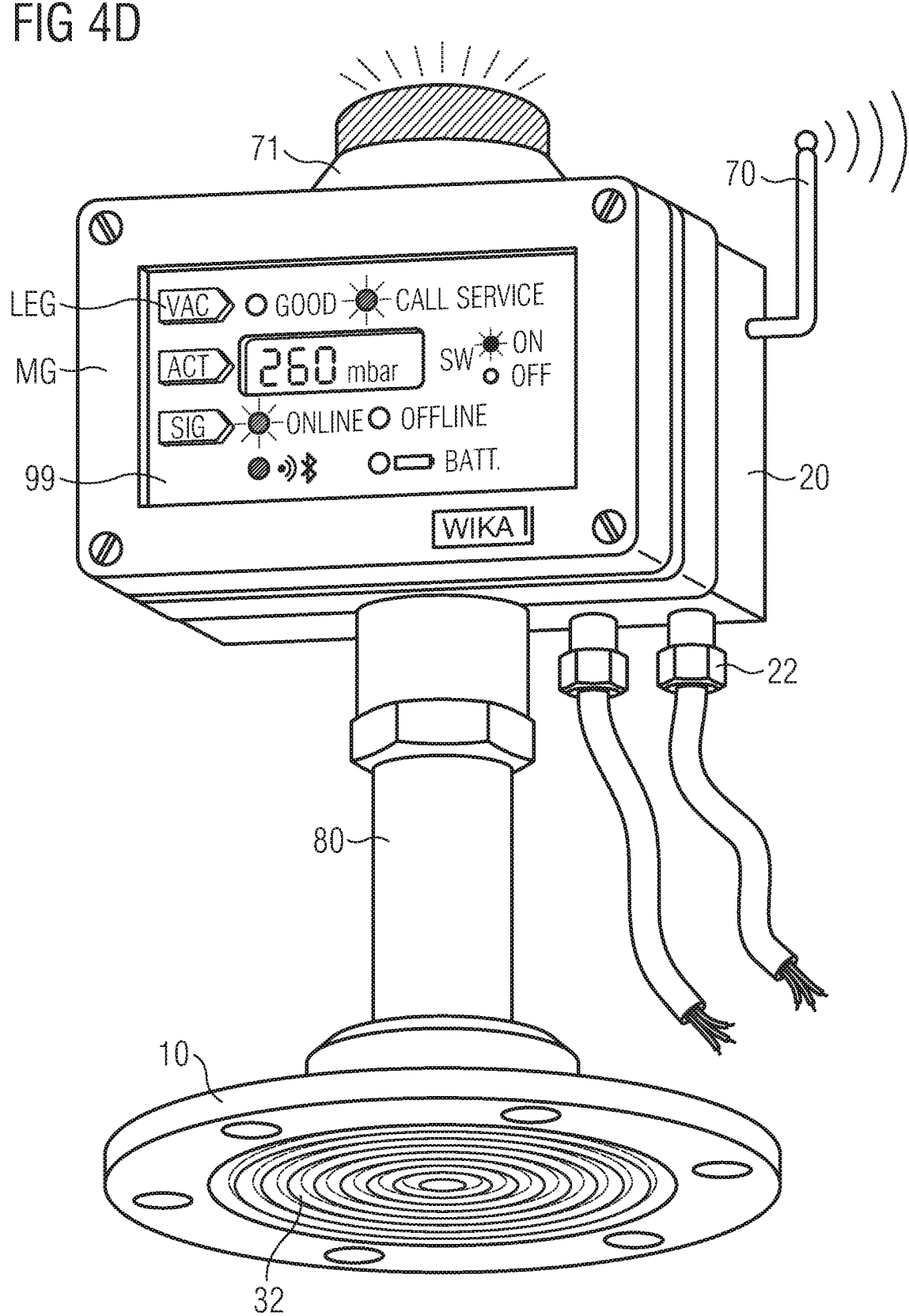
Figure 4E:
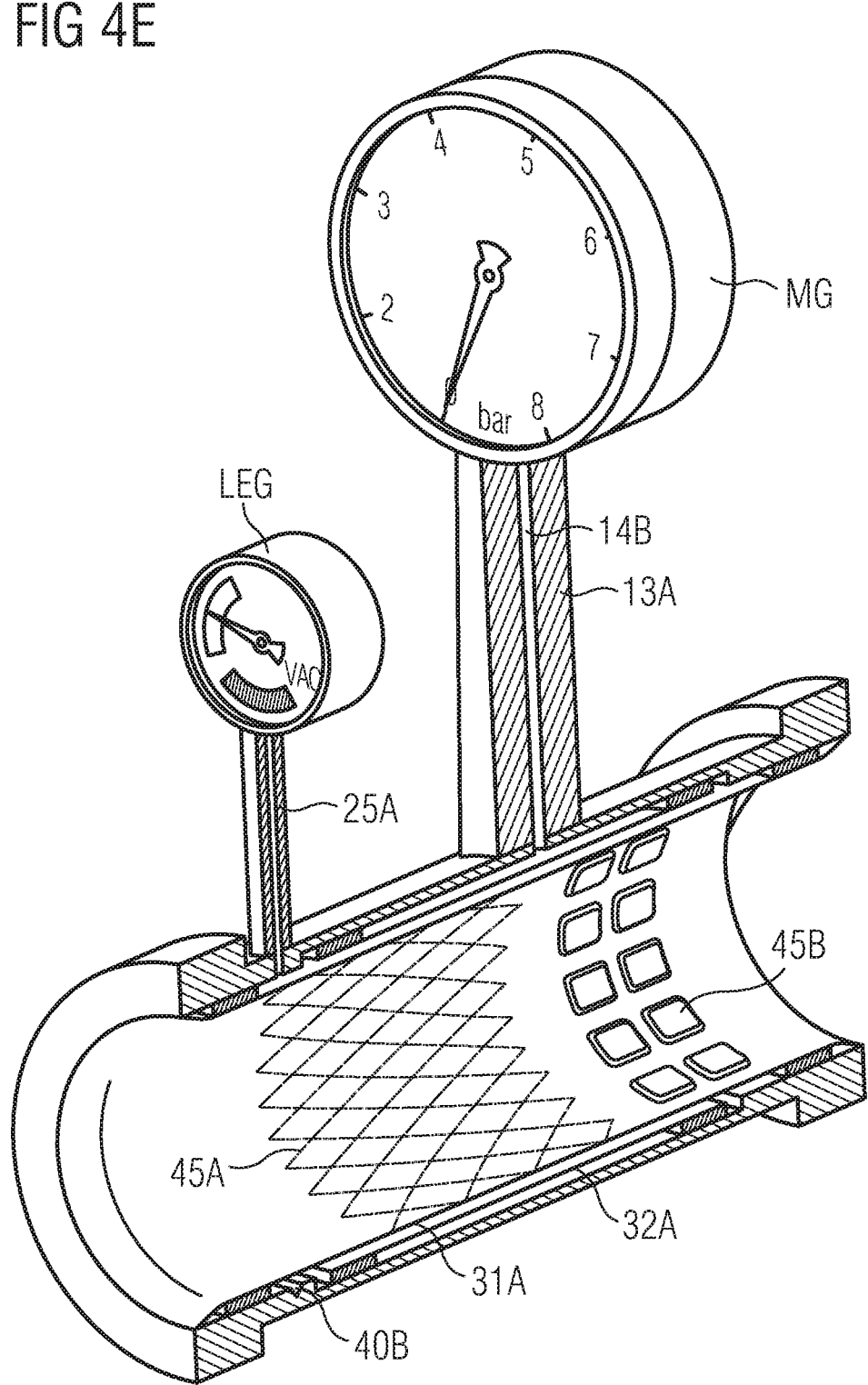

FIGS. 4C through 4E show other preferred embodiments of diaphragm seal assembly 1 according to the invention, a measuring element 90 in the form of a Bourdon spring being illustrated in FIG. 4C, which is mounted above a scale 93, integrated with a motion works 91 for driving a pointer 92, a gauge of second measuring instrument LEG being integrated into first measuring instrument MG in this embodiment, and thus its gauge also being integrated with the gauge of first measuring instrument MG for a shared viewing direction. For this purpose, first measuring instrument LEG is connected to vacuum channel 26 in base body 10 via a capillary 25C and is accommodated together with the pressure path in the form of pressure connecting channel 13 in a shared sleeve 80, which supports first measuring instrument MG. In this embodiment, diaphragms 31 and 32 are preferably soldered tightly to base body 10 with annular solder sections 81 and 82, i.e. soldered into the recess of base body 10. Base body 10 also has O rings as additional seals on an outer edge of its base.

FIG. 4D also shows second measuring instrument LEG mounted in such a way that it is integrated into measuring instrument MG, a common gauge displaying all information, and the measuring signal being optionally output via cable or by radio, in analog form at 4 mA to 20 mA or in digital form. The diaphragm seal assembly illustrated here has, in principle, a similar design to the diaphragm seal assembly from FIG. 4C. Depending on the process pressure, a pressure sensor is integrated, for example a piezoresistive pressure sensor or a sensor formed by a thin-film strain gauge arrangement or also a pressure switch for monitoring the vacuum, these sensors also being able to be integrated into the lower area of sleeve 80 or into base body 10. In particular when used for hot processes or hot process environments, sleeve 80 is used as a cooling spacer, in which case the sensors are preferably accommodated in housing 20, and the electronic evaluator is likewise connected on a circuit board which, together with gauge 99, is also conceivable as display 99. The present diaphragm seal assembly is also optionally provided with a flashing lamp 71 or also with an antenna 70, it also being conceivable that a separate power supply may be accommodated in the device, for example in the form of a battery or an accumulator. In particular, gauge 99 displays the instantaneous measured value as well as whether the vacuum is still intact. The gauge may furthermore display a process pressure, switching points, signal availability, connection or other states, such as the state of a battery which may be installed and its possible pending need to be changed.

FIG. 4E shows a special embodiment of the diaphragm seal assembly 1 according to the invention as a pipe diaphragm seal. In this design, the diaphragm assembly is provided in the form of two pipe diaphragms 31A, 32A disposed inside each other. This means that, in the embodiment illustrated here, the base body is a tubular base body, and the recess is situated in a pipe interior, i.e., in a continuous clearance in the form of a through-bore in the tubular base body. First diaphragm 31A and second diaphragm 32A are disposed coaxially to each other in the through-bore of the pipe in the form of pipe diaphragms. The recess is provided in the base body in such a way that at least two steps are provided in the base body, which form the two different levels, one level being the inner circumference of the tube interior and the other level being the inner circumference of the recess. As a result, the two levels are spaced apart by the predetermined minimum distance and are used to arrange first diaphragm 31A and second diaphragm 32A, so that first diaphragm 31A is disposed within second diaphragm 32A. In this case, the outer edge of first diaphragm 31A represents the outer circumference thereof, and the outer edge of second diaphragm 32A represents the outer circumference thereof. The diaphragm seal geometry must follow a pipeline inner wall and may not be provided with a flat or circular design. As in the embodiments above, first measuring instrument MG is connected to the diaphragm seal working chamber via pressure connecting channel 13A, and second measuring instrument LEG is coupled to the vacuum to be monitored via vacuum channel 25A, which opens, in particular, into a circular channel 40B between the two diaphragms.

This structure has the advantage that processes may also be detected by the diaphragm seal assembly according to the invention which require an optimum cleaning and emptying capability in all installation positions of the diaphragm seal assembly—in the form of a pipe diaphragm seal in this case. In particular, this is the cleaning with pigs, as already described above.

To improve the transmission process, the two diaphragms optionally receive defined formations, as illustrated here in the form of diamond patterns 45A or fields having bulges. To produce a formation of this type, it is conceivable to introduce one or two cores laterally in one or multiple parts into the pipe diaphragm seal, which are reminiscent of a Frankfurt apple wine glass (a so-called "Frankfurter Geripptes," i.e. glass with a raised diamond pattern, or a handle-less Munich bier glasses, i.e., glasses which have a raised circular pattern. Upon applying pressure to pressure path 14B via a connection, the double diaphragm structure, which has preferably been previously evacuated, is thus provided with a permanent embossing pattern.

The defined formation fields, (bulges), are then used as elastic working fields for a pressure transmission of the process pressure onto pressure path 14 on measuring instrument MG.

In this embodiment, as in all preceding embodiments, the intermediate space to be evacuated is previously optionally sterilized between the two diaphragms so as to not jeopardize processes if there is a crack in the process-side diaphragm.

Figure 5A:
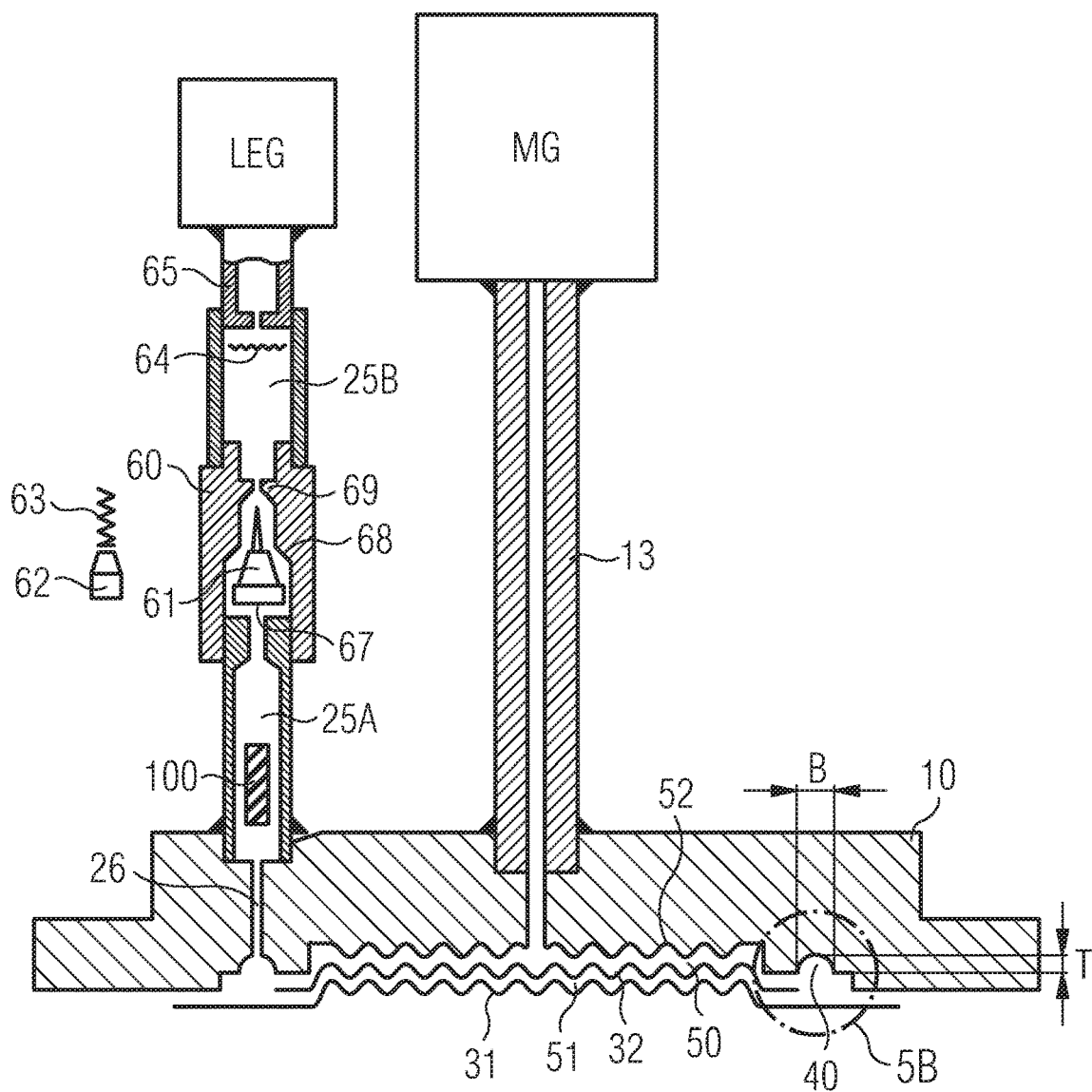
FIG. 5A shows a diaphragm seal according to the invention according to another preferred embodiment.
Figure 5B:
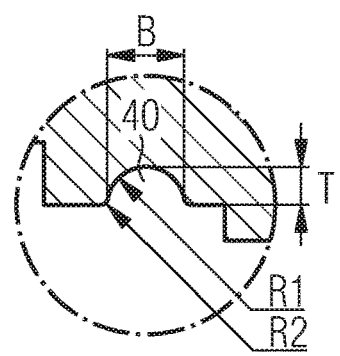
FIG. 5B shows an enlarged detailed view of the preferred embodiment of the diaphragm seal assembly according to the invention illustrated in FIG. 5A.

FIG. 5A shows a diaphragm seal according to the invention according to another preferred embodiment, and FIG. 5B shows an enlarged detailed view of the preferred embodiment of the diaphragm seal assembly according to the invention illustrated in FIG. 5A. More specifically, FIG. 5A shows the cross section of a diaphragm seal assembly 1, similar to the one in FIG. 1, second measuring instrument LEG having been optimized. Indeed, in this embodiment, second measuring instrument LEG for monitoring the vacuum between the two diaphragms 31, 32 also comprises a pressure measuring device; however, depending on the process pressure, it may be specially protected in the case of a diaphragm crack, so that an overpressure of the process pressure should not result in a destruction of this device if a diaphragm cracks. For this purpose, a valve section 60 is additionally provided in the two-part vacuum channel between its sections 25A and 25B, the valve section being inserted between first section 25A and second section 25B and including a two-part valve body 61 for contact with a first sealing seat 68 and/or a second sealing seat 69, the latter securely sealing channel 25A, 25B in at least one location or in two locations in the case of an overpressure, whereby second measuring instrument LEG is protected against damage. If the diaphragm cracks, a flow takes place on valve surface 67 and lifts valve body 61 against the force of gravity into first and/or second sealing seat 68, 69. Alternatively to two-part valve body 61, a simple valve plug 62 may be installed, which is loaded via a spring 63 and may come into contact with first or second sealing seat 68, 69 in the case of an overpressure. Additionally or alternatively thereto, a diaphragm 64 may furthermore be provided in a connecting area 65 of second measuring instrument LEG, which may also protect the latter against overload stresses.

In the present embodiment, a getter material 100 may also be introduced, for example into channel section 25A, which may bind free atoms or molecules and thus improve the vacuum quality over the lifetime of the assembly. Platinum or titanium may be considered as getter material 100, or also barium, aluminum, zirconium iron or pure or alloyed magnesium, preferably having an open, enlarged surface.

Moreover, in the preferred embodiment illustrated in FIG. 5A, diaphragm working chamber 50 behind secondary diaphragm 32 may be optimized. Similarly to FIG. 2, a corrugated diaphragm bed 52 is provided here, which has a corrugation corresponding to the geometry of the corrugation of secondary diaphragm 32, the corrugation of front, primary process diaphragm 31 also having the same type of geometry, an embossed corrugation, so that in the case of a fluid loss in pressure connecting channel 13, or in the case of an uneven load on the diaphragm, both diaphragms 31, 32 may be complementarily supported in the diaphragm bed and thus protected against damage.

To optimize vacuum chamber 51, groove 40 is furthermore provided with a semicircular shape in cross section, as is also illustrated in enlarged form in FIG. 5B, for example having a width B of 0.3 mm to 3 mm and a depth T of 0.2 mm to 1.5 mm, the semicircle being able to have a radius R1 of 0.1 mm to 1.5 mm, and edges R2 preferably being deburred or rounded. The total volume within all vacuum-carrying parts, including the vacuum channel, reaches a total volume of 3 ml to 100 ml, preferably 5 ml to 50 ml.

Vacuum repositories are furthermore conceivable, which further increase the vacuum and thereby improve it with regard to its longevity.

Figure 6:
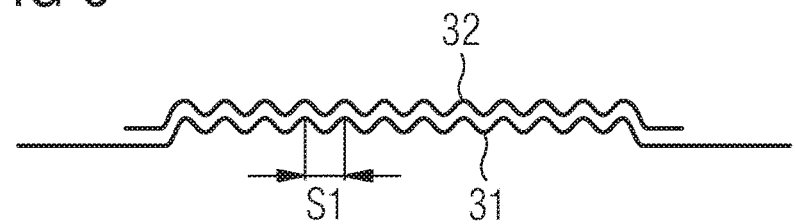
FIG. 6 shows a detailed view of a diaphragm arrangement of the preferred embodiments of the diaphragm seal assembly according to the invention.
Figure 6:
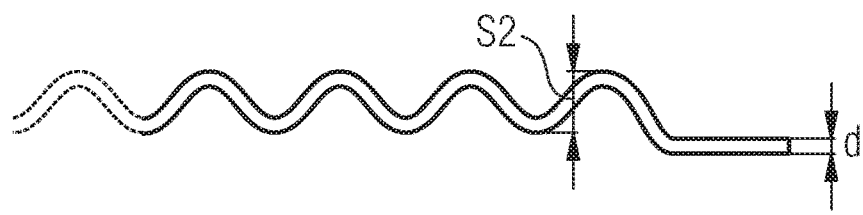

FIG. 6 shows a detailed view of a diaphragm arrangement of the preferred embodiments of the diaphragm seal assembly according to the invention, the two diaphragms 31, 32 having a corrugated design and each having a thickness d of 0.01 mm to 0.5 mm, preferably 0.03 mm to 0.2 mm. "Corrugated" is understood to mean that diaphragms 31, 32 each have a wavy surface, the particular corrugation in circular diaphragms 31, 32 beginning from the center outward and continuing toward the outside with annular wave crests and annular wave troughs, all of which are thereby disposed and formed concentrically to each other. Diaphragm 31 in this case has a complementary corrugation with respect to the corrugation of diaphragm 32 and vice versa, including a wave crest spacing S1, i.e., a wave amplitude, of 0.5 mm to 20 mm, preferably 0.7 mm to 12 mm. The two diaphragms 31, 32 furthermore have a so-called radial runout S2 of 0.1 mm to 2.0 mm, preferably 0.15 mm to 1.5 mm, in this case radial runout meaning the distance between the crest and trough of a wave of a diaphragm, i.e. the double amplitude of a wave. Alternatively, each diaphragm may have a stepped shape, with a step spacing of 0.5 mm to 20 mm, preferably 0.7 mm to 12 mm.

Figure 7A:
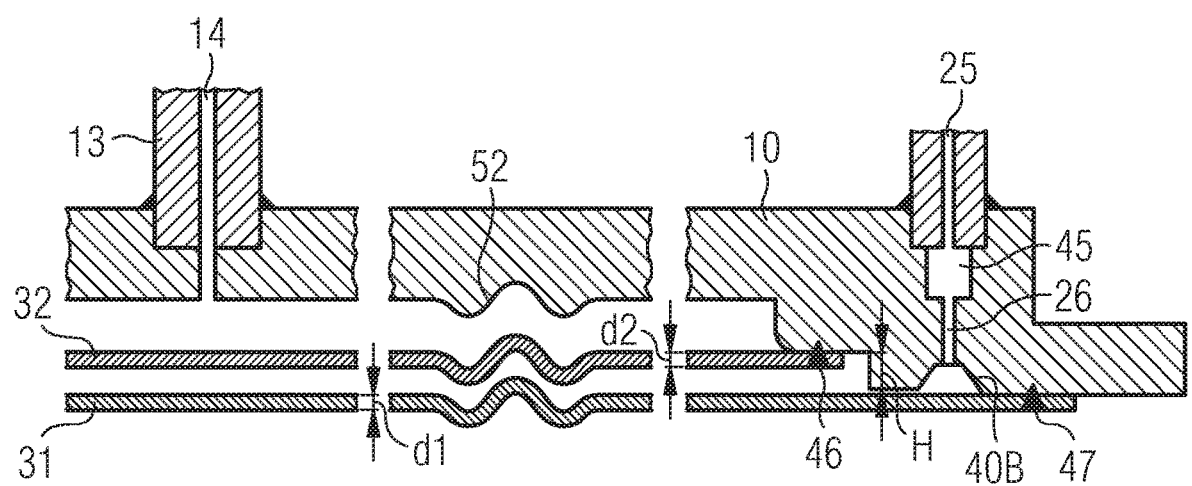
FIG. 7A shows a detailed view of an assembled diaphragm arrangement of the preferred embodiments of the diaphragm seal assembly according to the invention.

FIG. 7A shows a detailed view of a diaphragm arrangement of the preferred embodiments of the diaphragm seal assembly according to the invention in the premounted state, it being shown that the two recess steps form different levels having a predetermined minimum distance H, which is preferably at least greater than thickness d of rear pressure path-side interface diaphragm 32. A distance between first primary interface diaphragm 31 and second interface diaphragm 32 disposed congruently thereunder, thus results.

The diaphragms are either wavy, preferably as illustrated in FIG. 1 or 2 in the case of flange diaphragm seals, or flat and smooth, or provided with embossing in the case of a pipe diaphragm seal as illustrated in FIG. 4E. These variation possibilities are represented by interrupted sections.

It is moreover possible to further structurally enlarge the vacuum volume in path 25, 26 for monitoring the vacuum by implementing vacuum repositories 45.

Both diaphragms 31, 32 are preferably connected to the base body by weldings 46, 47.

The predetermined minimum distance between the diaphragms results from dimension H, which results in this case from an addition of 0.05 mm to 0.5 mm to diaphragm thickness d2.

Diaphragm thicknesses d1 and d2 of both diaphragms can be the same.

In particular, the diaphragm seal has a formed-on circular groove channel 40B, which is produced by turning or milling and opens into vacuum channel 26. The cross section is preferably 0.5×1.0 mm or 0.2 mm to 2.0 mm×0.5 mm to 5.0 mm and facilitates, as described above, an optimum process for producing the double diaphragm in that the diaphragms are evacuated all the way around in diameter. Combined with the step, the diaphragms preferably approach each other with deflection first in the middle and are further joined "bubble-free" into a double diaphragm or "sandwich" diaphragm.

At the same time, the circumferential groove also makes it possible to transfer the change in pressure as quickly as possible to measuring instrument LEG in the case of a leak. Delays in reading measuring instrument LEG caused by remaining vacuum and this still adhering points are ruled out.

The groove is preferably a circular ring channel situated around the outer edge of second diaphragm 32 but within the outer edge of first diaphragm 31.

Figure 7B:
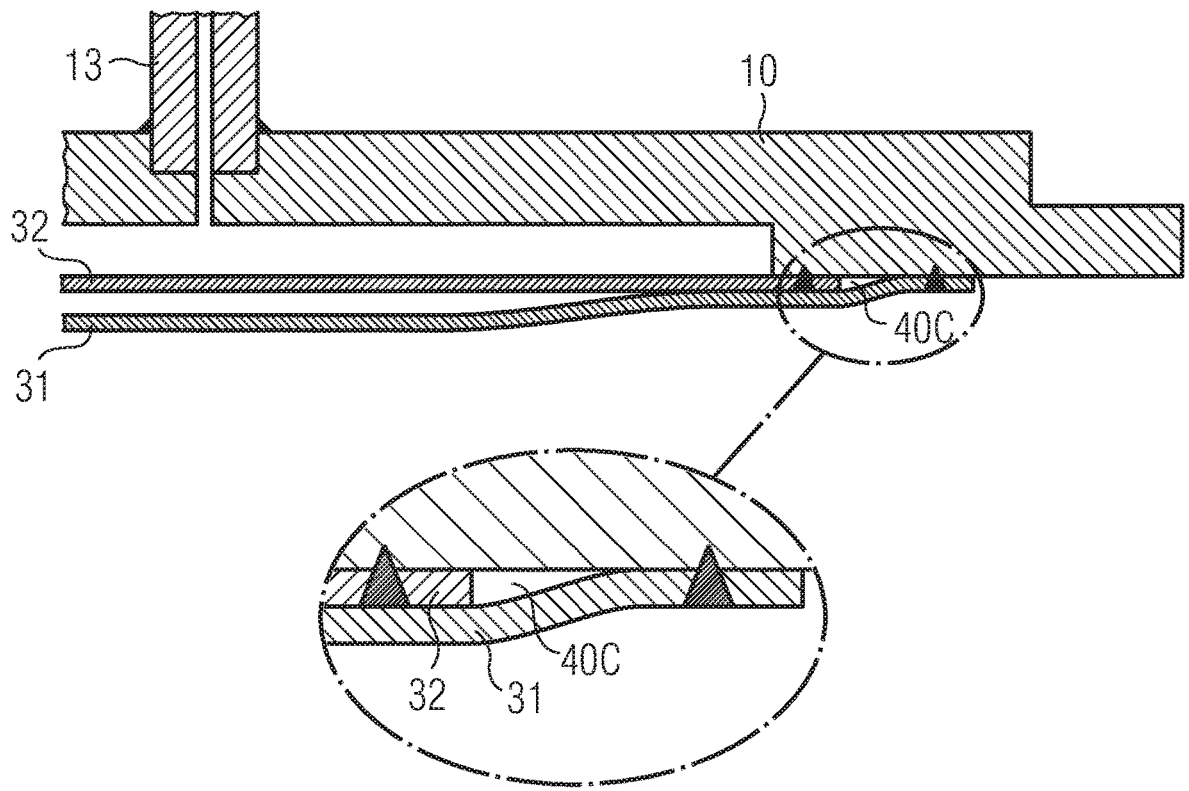
FIG. 7B shows a detailed view of an assembled diaphragm arrangement of the preferred embodiments of the diaphragm seal assembly according to the invention without a step but including a gap channel.

FIG. 7B shows a detailed view of a diaphragm arrangement of the preferred embodiments of the diaphragm seal assembly according to the invention, also in the assembled, premounted state but before the vacuum is applied, it being shown that a circular gap (40C) may also form in that the 2 diaphragms are placed directly above each other and welded. A circumferential annular gap also results in this manner, which results in a behavior and a joining process for manufacturing a double diaphragm like that in FIG. 7A.

The circumferential gap results, in particular on the outer edge of inner diaphragm 32 and is situated around the outer edge of first diaphragm 31 but within the outer edge of second diaphragm 32 and then preferably has a size of at least 0.03 mm to 0.3 mm×1.0 mm to 5.0 mm, but preferably 0.05 mm×2.0 mm, provided with a radius as illustrated in the detailed view by bending diaphragm 31.

Figure 7C:
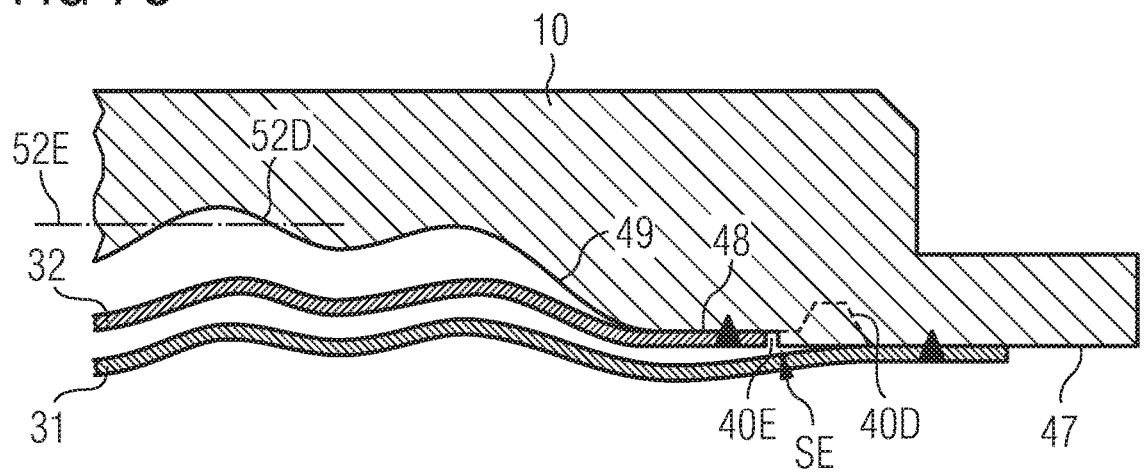
FIG. 7C shows a detailed view of an assembled, pre-mounted diaphragm arrangement according to an embodiment of the diaphragm seal assembly according to the invention, in this case including a corrugated diaphragm bed, a first step from the diaphragm bed to the fastening level for the smaller diaphragm, this step being designed with a radial transition and having a circular vacuum channel between an outer edge of the diaphragm and a step to levels on which the process diaphragm is fastened.

FIG. 7C shows a detailed view of a diaphragm arrangement of the preferred embodiments of the diaphragm seal assembly according to the invention in the assembled, premounted state but still before the vacuum is applied, so that the diaphragms are not yet in contact with each other. It is shown that diaphragm base, identified here as level 52E, is preferably formed by a continuous wave shape 52D, the middle between the crest and trough of one wave being viewed as the base level. The embodiment is further characterized in that a first step is formed, not in a sharp-edged manner but rather in that the guidance of the diaphragm bed tangentially to level 48 with a radius 49 may be viewed here as a step on which diaphragm 32 comes to rest.

In particular, a circular gap, circumferential vacuum channel (40E), may form on the outer diameter of diaphragm (32), in that the diameter of the adjacent step is greater than the outer diameter of the diaphragm. This channel space may be optionally enlarged in that the next step (SE), the step contour, is relocated farther to the outside or is formed as channel step (40D) (illustrated here by the dashed line).

Process-side diaphragm (31) is then placed on level (47) adjacent to step (SE) and welded, as described above.

The distance between the diaphragm levels can be between 0.02 mm and 1.5 mm.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A diaphragm seal assembly comprising:
   a base body that includes at least one first diaphragm and a second diaphragm, the first diaphragm facing a process medium to be monitored, the second diaphragm facing a fluid-filled pressure path;
   a first measuring instrument for monitoring a pressure of the process medium;
   a second measuring instrument;
   an intermediate space formed between the first diaphragm and the second diaphragm, the intermediate space being evacuated, the second measuring instrument monitoring a vacuum present in the intermediate space; and
   a circular ring channel arranged around an outer edge of the second diaphragm and within an outer edge of the first diaphragm,
   wherein a recess is provided in the base body including at least two recess steps in the base body, which are spaced apart by a predetermined minimum distance and are used to arrange the first diaphragm and the second diaphragm, and wherein the outer edge of the first diaphragm is disposed on one recess step, and the outer edge of the second diaphragm is disposed on another recess step, and
   wherein the circular ring channel is fluid-connected to the second measuring instrument, is provided in the another recess step of the second diaphragm and is situated laterally outside the outer edge of the second diaphragm, the circular ring channel being formed to run around the second diaphragm in a semicircle, and the circular ring channel having a width of 0.3 mm to 3 mm and a depth of 0.2 mm to 1.5 mm.

2. The diaphragm seal assembly according to claim 1, wherein the predetermined minimum distance corresponds to a minimum distance between the first diaphragm and the second diaphragm, wherein said predetermined minimum distance is 0.02 mm to 1.5 mm.

3. The diaphragm seal assembly according to claim 1, wherein the predetermined minimum distance corresponds to a minimum distance between the first diaphragm and the second diaphragm and is defined by a recess step dimension, which is 0.05 mm to 1.5 mm greater than a thickness of the second diaphragm.

4. The diaphragm seal assembly according to claim 1, wherein a predetermined minimum distance between the first diaphragm and the second diaphragm is equal to a thickness of the second diaphragm plus a number, wherein said number is in a range from 0.01 mm to 1.2 mm.

5. The diaphragm seal assembly according to claim 1, wherein the first diaphragm and the second diaphragm have a thickness of 0.01 mm to 0.5 mm, and
   wherein the first diaphragm and the second diaphragm have a corrugated design with a wave length of 0.5 mm to 20 mm and a double amplitude of 0.1 mm to 2.0 mm, or the first diaphragm and the second diaphragm have a step-shaped design with a step spacing of 0.5 mm to 20 mm.

6. The diaphragm seal assembly according to claim 1, wherein a measuring signal of the first measuring instrument is looped through the second measuring instrument and, in a case of a leak, the second measuring instrument applies an error signal to the looped-through measuring signal.

7. The diaphragm seal assembly according to claim 1, wherein a gauge of the first measuring instrument is oriented in a same axis as a gauge of the second measuring instrument or wherein a gauge of the first measuring instrument and a gauge of the second measuring instrument are integrated into a shared gauge.

8. The diaphragm seal assembly according to claim 1, wherein a total inner volume within all of the circular ring channel, the intermediate space, a vacuum channel leading from the circular ring channel to the second measuring instrument, an evacuation connection of the vacuum channel and the second measuring instrument is in a range of 3 ml to 100 ml, and
wherein a diameter of the first diaphragm is 8 mm to 200 mm or a diameter of the first diaphragm is 5 mm to 80 mm larger than a diameter of the second diaphragm.

9. The diaphragm seal assembly according to claim 1, wherein the intermediate space between the first diaphragm and the second diaphragm is sterilized or structurally enlarged by vacuum repositories.

10. The diaphragm seal assembly according to claim 1, wherein the ring channel is formed as a groove, which is formed into the base body by turning or milling.

11. The diaphragm seal assembly according to claim 1, wherein the ring channel is a circumferential gap between the second diaphragm and the first diaphragm, wherein the first diaphragm is larger than the second diaphragm.

12. The diaphragm seal assembly according to claim 1, wherein a predetermined minimum distance between the first diaphragm and the second diaphragm is equal to a thickness of the second diaphragm plus a number, wherein said number is in a range from 0.05 mm to 0.5 mm.

13. The diaphragm seal assembly according to claim 1, wherein the first diaphragm and the second diaphragm have a thickness of 0.03 mm to 0.2 mm, and
wherein the first diaphragm and the second diaphragm have a corrugated design with a wave length of 0.7 mm to 12 mm and a double amplitude of 0.15 mm to 1.5 mm, or the first diaphragm and the second diaphragm have a step-shaped design with a step spacing of 0.7 mm to 12 mm.

14. The diaphragm seal assembly according to claim 1, wherein a total inner volume within all of the circular ring channel, the intermediate space, a vacuum channel leading from the circular ring channel to the second measuring instrument, an evacuation connection of the vacuum channel and the second measuring instrument is in a range of 5 ml to 50 ml, and
wherein a diameter of the first diaphragm is 12 mm to 120 mm or the diameter of the first diaphragm is 8 mm to 50 mm larger than a diameter of the second diaphragm.

15. The diaphragm seal assembly according to claim 1, wherein the circular ring channel is a curved or tapered groove provided in the another recess step, and wherein the groove is fluidically connected to a vacuum channel of the second measuring instrument.

16. A diaphragm seal assembly comprising:
a base body that includes at least one first diaphragm and a second diaphragm, the first diaphragm facing a process medium to be monitored, the second diaphragm facing a fluid-filled pressure path;
a first measuring instrument for monitoring a pressure of the process medium;
a second measuring instrument;
an intermediate space formed between the first diaphragm and the second diaphragm, the intermediate space being evacuated, the second measuring instrument monitoring a vacuum present in the intermediate space; and
a circular ring channel arranged around an outer edge of the second diaphragm and within an outer edge of the first diaphragm,
wherein the first diaphragm and the second diaphragm are pipe diaphragms, and the first diaphragm is disposed within the second diaphragm, the outer edge of the first diaphragm representing an outer circumference thereof, and the outer edge of the second diaphragm representing an outer circumference thereof, and the outer circumference of the first diaphragm and the outer circumference of the second diaphragm are spaced apart by a predetermined minimum distance.

17. A diaphragm seal assembly comprising:
a base body that includes at least one first diaphragm and a second diaphragm, the first diaphragm facing a process medium to be monitored, the second diaphragm facing a fluid-filled pressure path;
a first measuring instrument for monitoring a pressure of the process medium;
a second measuring instrument;
an intermediate space formed between the first diaphragm and the second diaphragm, the intermediate space being evacuated, the second measuring instrument monitoring a vacuum present in the intermediate space; and
a circular ring channel arranged around an outer edge of the second diaphragm and within an outer edge of the first diaphragm,
wherein the second measuring instrument and the intermediate space between the first diaphragm and the second diaphragm are fluid-connected by a vacuum channel, and an evacuation connection is connected gas-tight to the vacuum channel, the evacuation connection being sealed doubly gas-tight by a first direct welding of the evacuation connection or by a plug placed at the evacuation connection, and by a second welding of a cap.

18. The diaphragm seal assembly according to claim 17, wherein at least one of a valve or a vacuum channel diaphragm are integrated into the vacuum channel, which protect the second measuring instrument against overpressure in a case of a leak.

19. The diaphragm seal assembly according to claim 17, wherein the ring channel has a circular ring gap, which results from arranging the first diaphragm and the second diaphragm above one another and connecting them to a part on a shared level of the base body on the outer edge of the second diaphragm.

20. The diaphragm seal assembly according to claim 17, wherein the ring channel has a minimum cross sectional area of 0.03 mm to 3.0 mm×1.0 mm to 5.0 mm.

* * * * *